United States Patent [19]

Schneider

[11] Patent Number: 4,988,936
[45] Date of Patent: Jan. 29, 1991

[54] CORRELATED COARSE POSITION ERROR PROCESSOR

[75] Inventor: Rudy L. Schneider, Santa Clara, Calif.

[73] Assignee: Carco Electronics, Menlo Park, Calif.

[21] Appl. No.: 396,597

[22] Filed: Aug. 21, 1989

[51] Int. Cl.⁵ .............................................. G05B 11/18
[52] U.S. Cl. .................................... 318/632; 318/592; 318/594; 318/593
[58] Field of Search .............................. 318/560-646; 364/180-182, 474.14

[56] References Cited

U.S. PATENT DOCUMENTS

| | | | |
|---|---|---|---|
| 3,686,547 | 8/1972 | Kelling | 318/594 |
| 3,850,105 | 11/1974 | Aronstein et al. | 318/592 X |
| 4,253,051 | 2/1981 | Schneider | |
| 4,843,291 | 6/1989 | Predina | 318/632 X |

Primary Examiner—William M. Shoop, Jr.
Assistant Examiner—Paul Ip
Attorney, Agent, or Firm—Townsend and Townsend

[57] ABSTRACT

A technique for overcoming the difficulties that arise from the transition between coarse and fine loop control. Coarse and fine phase locked loops, each having a respective latch, provide a coarse number in the range 000.0°–359.9° and a fine number in the range of 0.0000°–0.9999°. The coarse number is offset relative to the fine number so that the least significant digit (tenths digit) of the coarse number is always less than the most significant digit (tenths digit) of the fine number over the entire range of motion. The fine number latch is clocked by a reference clock (ZDS) while correlation circuitry provides a clock signal for the coarse number latch. The correlation circuitry generates the clock signal when the tenths digit of the coarse number agrees with the latched fine number. The result is a latched fine number and a coarse number that is latched when it correlates with the fine number (tenths digits agree). A fine error is produced by comparing the fine PLL counter data against the fine angle command data. A correlated coarse error is produced by comparing the coarse command and the correlated coarse number (subtracting and scaling). The fine error and the correlated coarse error are communicated to the two poles of an analog switch, and the fine error is selected whenever the correlated coarse error is less than a predetermined threshold.

6 Claims, 3 Drawing Sheets

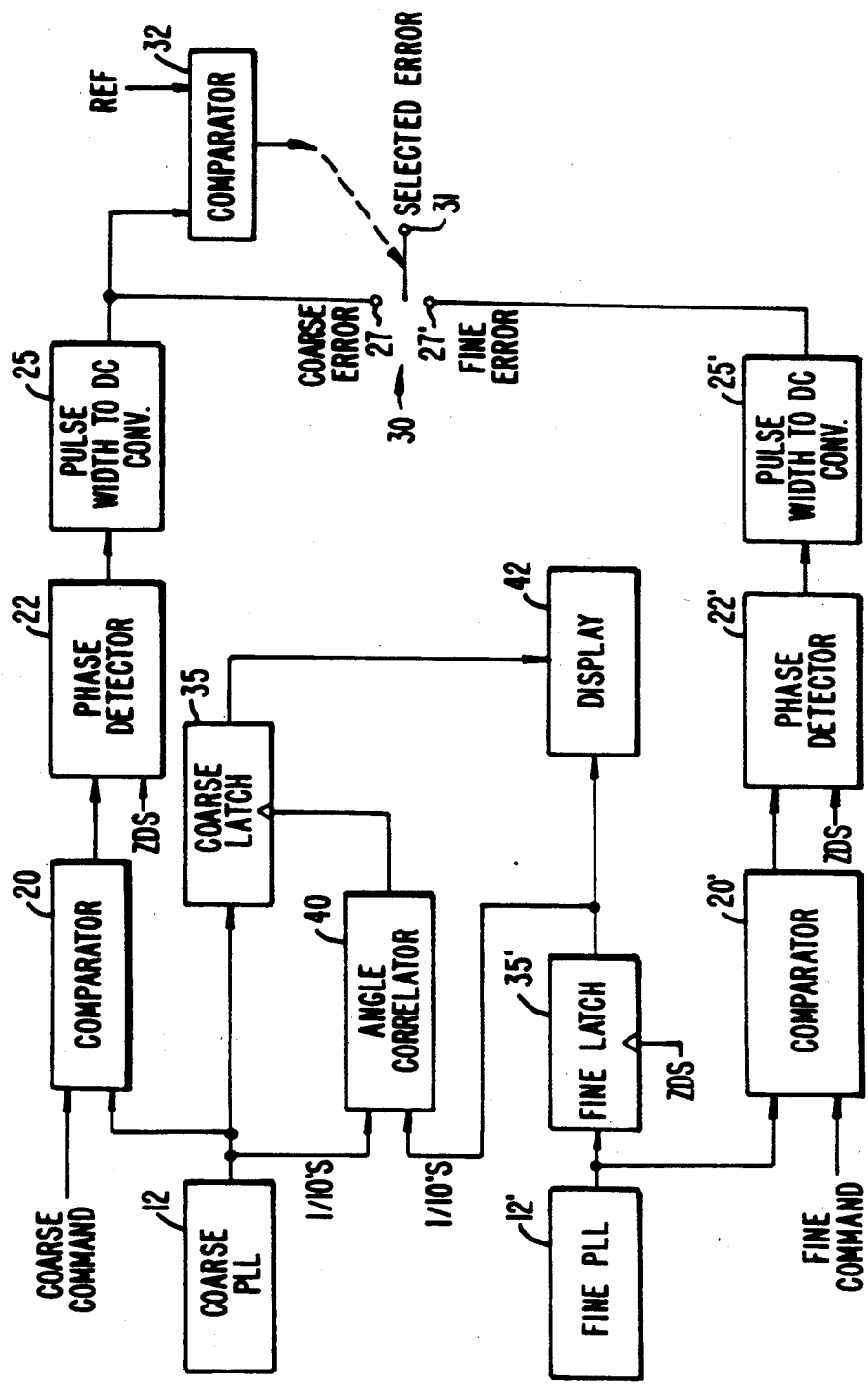
FIG._1. (PRIOR ART)

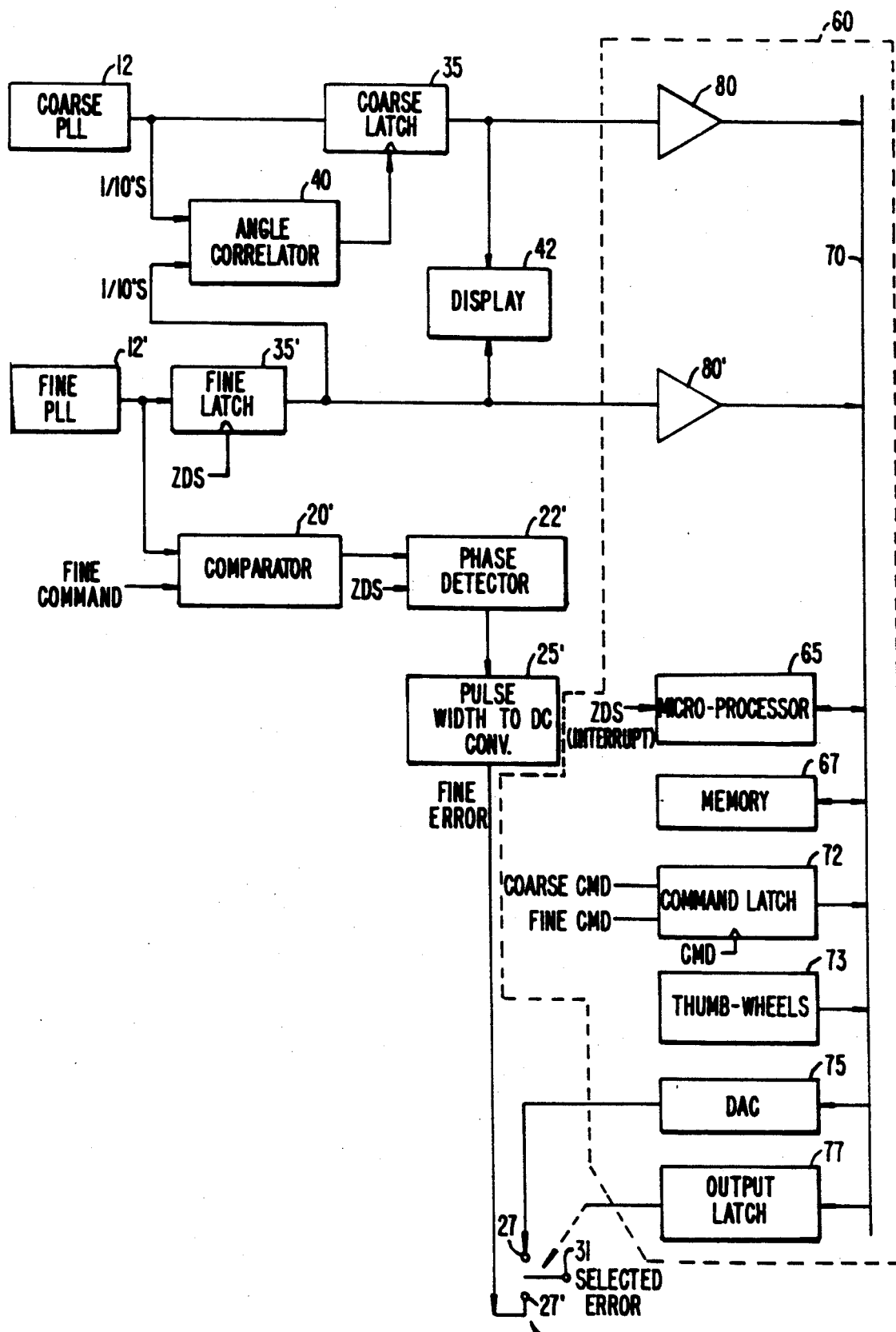
FIG._2.

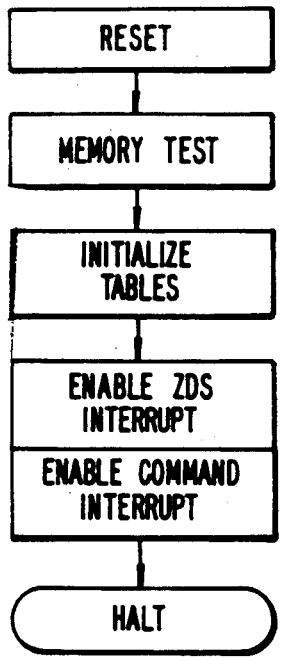
FIG._3A.
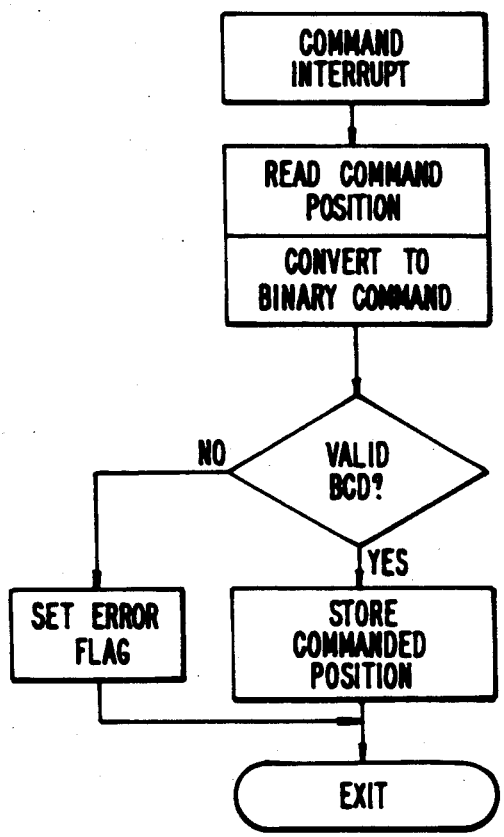
FIG._3B.
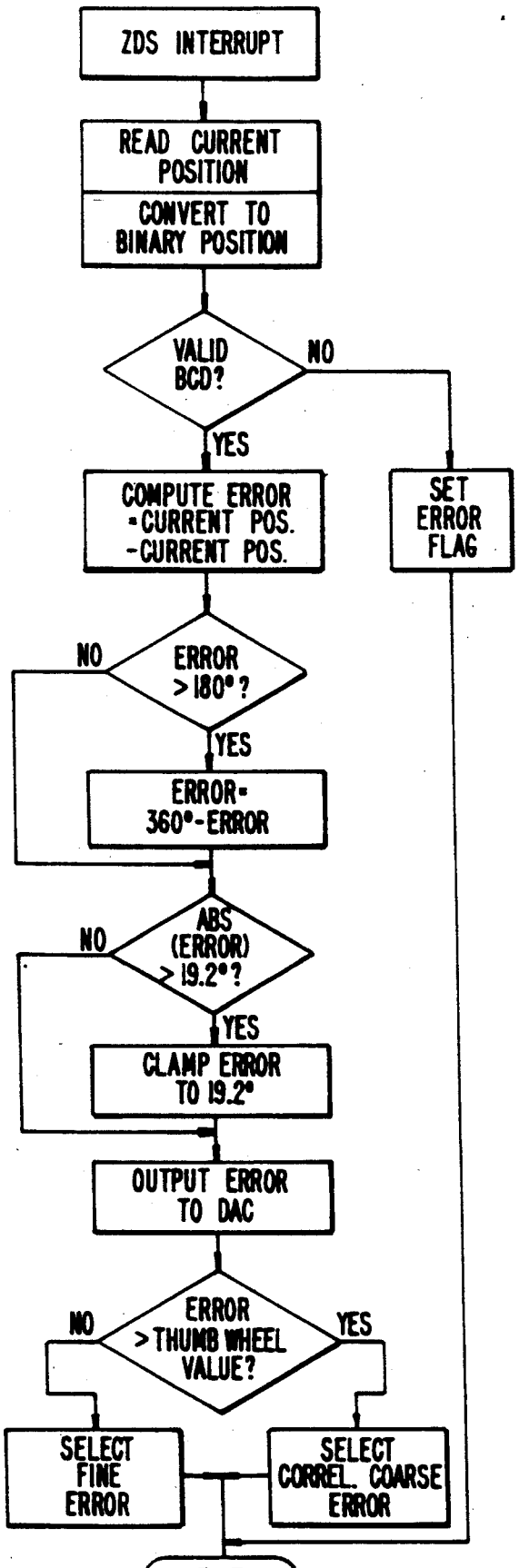
FIG._3C.

CORRELATED COARSE POSITION ERROR PROCESSOR

BACKGROUND OF THE INVENTION

The invention relates to devices, such as flight simulators where the position (angular or linear) of a movable element relative to a fixed element must be measured very accurately. The invention relates more specifically to the servo control of such devices.

A flight simulator provides a platform supported in a gimballed arrangement, so that the platform may be rotated about one of the axes. A control system for rotation about one of the axes typically includes an actuator such as a torquer, a position sensor such as a resolver, a mechanism for generating position commands, and a closed loop servo for causing the position to track the command.

U.S Pat. No. 4,253,051, hereby incorporated by reference, describes portions of a representative prior art system. In brief, the position sensor typically includes a stator, a rotor inductively coupled to the stator, and circuitry for exciting the stator and detecting the induced signal in the rotor. The relative phase between the stator and rotor signals is representative of the relative displacement between the stator and rotor.

A known way of measuring the phase difference is to generate pulses at a frequency that is a fixed factor multiple of the rotor output signal frequency. The number of pulses occurring between corresponding points in the stator and rotor signal cycles, divided by the fixed factor, gives the fraction of a cycle that the two signals are out of phase. The frequency multiplication may be accomplished by a digitally closed phase locked loop (sometimes referred to as a PLL or a loop). The PLL includes, among other things, a frequency divider corresponding to the fixed factor multiple to be achieved, and a counter whose output represents the relative position.

It is known in the art to provide separate coarse and fine measurements of the relative position. Each requires a separate resolver and PLL. The coarse number is capable of defining the position within the entire expected range, while the fine number defines positions within a range that is much narrower. For example, a two-pole resolver generates a 360° phase shift between the stator excitation signal and the rotor output signal for every 360° of relative mechanical rotation, and is suitable for extracting the coarse number. A 720-pole resolver produces an electrical phase shift of 360° for every 1° of relative mechanical rotation, and may be used to extract the fine number.

The divisions are typically chosen so that the coarse and fine numbers have a common range of resolution, i.e., the least significant portion or digit of the coarse number would overlap the most significant portion or digit of the fine number. Using a coarse number divisor of 3600 and a fine number divisor of 10,000 gives a coarse number that is generally accurate to 0.1° over a range of 0-359.9° and a fine number that is accurate to 0.0001° over a range of 0-0.999°. Thus, each number has a tenths digit. In a typical system, the tenths digit of the coarse number will deviate from the tenths digit of the fine number as the rotors are rotated over the full 360° range, with a typical error being about ±0.2°.

The coarse and fine numbers are used to generate coarse and fine position errors for the servo as follows. The output from the coarse (or fine) PLL counter is applied to one side of a digital comparator while the coarse (or fine) angle command is applied to the other. Once the coarse (or fine) PLL counter data corresponds to the coarse (or fine) command, a pulse is generated which is applied to one input of a digital phase detector, while the reference clock (zero degree strobe, or ZDS) is applied to the other input. The output from the phase detector is a pulse train whose pulses each have a width proportional to the difference between the actual coarse (or fine) position number and the coarse (or fine) position command. This pulse train is then applied to a pulse-width to DC voltage converter, resulting in an analog error voltage proportional to the coarse (or fine) position error.

The coarse and fine position error voltages are applied to the two poles of an analog switch. Since it is the intent to position the relatively movable objects to within the resolution of the fine position command in a closed loop servo system, it is necessary to select between the coarse and fine position errors. This is done by using an analog voltage window comparator. For coarse position errors greater than the comparator's threshold voltage, the coarse position error is selected. When the coarse position error voltage falls below the threshold, the comparator output changes and the fine position error voltage is selected.

The basic philosophy behind generating separate coarse and fine position error voltages has been used on several systems with little or no difficulty. Precision rate-of-turn tables and precision angular positioners are well suited to this. However, for systems in which high dynamic motion and/or large amplitude motion is expected, the transition between coarse and fine loop control may result in less than smooth motion.

SUMMARY OF THE INVENTION

The present invention provides a technique for overcoming the difficulties that arise from the transition between coarse and fine loop control.

In brief, the coarse position error is based on a correlated coarse position value that takes into account possible offset and scaling mismatches between the coarse and fine position errors. According to one aspect of the invention, coarse and fine phase locked loops, each having a respective latch, provide coarse and fine numbers. In a preferred embodiment the coarse number is in the range 000.0°-359.9° and the fine number is in the range of 0.0000°-0.9999°. The coarse number is offset relative to the fine number so that the least significant digit (tenths digit) of the coarse number is always less than the most significant digit (tenths digit) of the fine number over the entire range of motion.

The fine number latch is clocked by a reference clock (ZDS) while correlation circuitry provides a clock signal for the coarse number latch. The correlation circuitry is responsive to the coarse number and the latched fine number, and generates the clock signal when the tenths digit of the coarse number agrees with the latched fine number. The result is a latched fine number and a coarse number that is latched when it correlates with the fine number (tenths digits agree).

A fine error is produced by comparing the fine PLL counter data against the fine angle command data, phase detecting the relationship of this occurrence and the reference clock ZDS, and converting the resultant pulse width modulated signal to a DC voltage proportional to the difference between the fine command and actual fine position.

A correlated coarse error is produced by comparing the coarse command and the correlated coarse number (subtracting and scaling). The fine error and the correlated coarse error are communicated to the two poles of an analog switch, and the fine error is selected whenever the correlated coarse error is less than a predetermined threshold.

The present invention, in addition to relieving possible offset and scaling mismatches between the coarse and fine position errors, has the additional advantage of improved resolution on the coarse (correlated coarse) position error. In the prior art, the coarse position error was limited in resolution to 0.1° while the correlated coarse position error provides analog output voltage resolution down to 0.001°.

A further understanding of the nature and advantages of the present invention may be realized by reference to the remaining portions of the specification and drawings.

BRIEF DESCRIPTION OF THE DRAWINGS

FIG. 1 is a block diagram of a prior art position error generation apparatus;

FIG. 2 is a block diagram of position error generation apparatus according to the present invention; and FIGS. 3A–C are flowcharts of the software for the microprocessor in the position error generation apparatus.

DESCRIPTION OF THE PREFERRED EMBODIMENT

FIG. 1 is a block diagram of a prior art position error generation apparatus 10. In accordance with known practice coarse and fine phase locked loops 12 and 12' provide coarse and fine numbers representing position measurements. In a known embodiment, coarse loop 12 provides a coarse number consisting of four BCD digits in the range 000.0°–360.0°, While fine loop 12' provides a fine number consisting of four BCD digits in the range 0.0000°–0.9999°.

The purpose of apparatus 10 is, among other things, to generate an error signal representing the difference between the sensed position and the coarse and fine command numbers generated in other parts of the system. The coarse error is generated by comparing the coarse number and the coarse command at a comparator 20. The comparator output is communicated to a phase detector 22 and is phase compared with a zero degree strobe (ZDS) reference clock. The phase detector output is a pulse train whose pulses each have a width proportional to the difference between the coarse position number and the coarse position command. This pulse train is communicated to a pulse width to DC converter 25, which produces an analog DC voltage proportional to the difference between the coarse position number and the coarse command. The fine error is determined in the same manner, namely by a comparator 20', a phase detector 22', and pulse width to DC converter 25'.

The coarse and fine errors are communicated to respective poles 27 and 27' of an analog switch 30. Switch 30 has an error output terminal 31 and is controlled by the output of a window comparator 32, which receives as inputs a reference voltage and the coarse error signal. When the coarse error falls below the reference voltage, the fine error is selected. Otherwise, the coarse error is selected.

Also associated with the position error generation apparatus is circuitry for displaying the position values. The coarse and fine numbers are communicated to the data inputs of respective coarse and fine latches 35 and 35'. Fine latch 35' is clocked by ZDS, and the tenths digit is communicated to one input of a correlation circuit 40. Correlation circuit 40 receives as another input the tenths digit of the coarse number from loop 12.

The purpose of correlation circuit 40 is to correlate the coarse and fine numbers in the display, designated 42. In this example, the coarse and fine numbers both contain digits corresponding to 0.1°. The fine number tenths digit is the more accurate one. For example, if the tenths digit of the coarse number and the tenths digit of the fine number were equal at some time, as the rotors were rotated around the full 360°, the tenths digit of the coarse and fine latched data would change relative to one another, with a typical error being ±0.2°. Thus, if the fine number at 359° read 0.0000° and the coarse number read 358.8, latching both at the same time would give 358.0000° rather than the correct 359.0000°.

To overcome this problem, the tenths digit of the coarse number is purposely offset by −0.5°(±0.2°). The fine number is first latched (clocked by ZDS) into the display, and the coarse data is allowed to catch up. Once the coarse number tenths digit becomes equal to the fine data tenths digit, correlation circuit 40 provides a clock signal to coarse latch 35. Since the coarse latch 35 is only clocked when the tenths digits agree, the display shows the correct value of the coarse number combined with the fine number.

FIG. 2 is a block diagram of position error generation apparatus 50 according to the present invention. Much of the circuitry is similar to that in the prior at apparatus shown in FIG. 1, and the same reference numerals will be used for corresponding elements. The fine command and the fine number from loop 12 are communicated to comparator 20', phase detector 22' and pulse width DC converter 25' to generate the fine error as described above. Fine latch 35' is clocked by ZDS to provide the fine number data for the display. Additionally, correlation circuit 40 is used to clock coarse latch 35 when the tenths digits of the coarse number and the latched fine number are equal to provide a correlated coarse position number for the display. The fine error is applied to pole 27' of analog switch 30 as in the previous case. However, the coarse position error that is applied to the other pole of the switch is generated in a different manner, as will be described below.

The coarse error is generated by a computer subsystem 60, which includes a microprocessor 65 (a Motorola 68000 in the preferred embodiment) and associated memory 67, coupled to a 16-bit data bus 70. Also coupled to the data bus are a command input latch 72, a set of thumbwheel switches 73 (or other user-settable device), a digital-to-analog converter (DAC) 75 whose output is coupled to pole 27 of switch 30, an output latch 77 whose output controls switch 30, and coarse and fine input buffers 80 and 80'. The outputs of latches 35 and 35' are coupled to the data bus through buffers 80 and 80'.

FIGS. 3A–C are flowcharts of the program stored in memory 67. Microprocessor 65 is periodically interrupted by the ZDS signal, whereupon it reads the output from buffers 80 and 80'. It is noted that at the time of the ZDS signal the coarse data has not yet been latched, since it is only latched after correlation circuit 40 detects a match between the tenth digits of the coarse and fine numbers. However, by the time the microprocessor responds to the interrupt, the coarse data will have been latched at coarse latch 35. The coarse and fine commands are latched a synchronously at command latch 71 and they are also read by the microprocessor.

The microprocessor compares the command values against the correlated coarse and the fine values, performs a subtraction and scales the result to generate a correlated coarse position error, which is communicated to DAC 75. The scaling is such that the output at DAC matches the fine position error scaling (0.52 volt/degree in the preferred embodiment). At this scaling, correlated coarse position errors in the range of ±19.2° fall within the DAC's linear range. Moreover, for a 16-bit DAC, the correlated coarse position error has a precision of 0.001°.

As mentioned above, the output of DAC 75 is communicated to pole 27 of analog switch 30 while the fine error is communicated to pole 27'. Thumbwheel switches 73 are set to a threshold value that determines when the correlated coarse position error is selected and when the fine error is selected. When the correlated coarse position error exceeds the value set in the thumbwheel switches, the correlated coarse position error is selected; when the correlated coarse position error falls below the value set in the thumbwheel switches the fine position error is selected. Since the fine error as a function of angle is a sawtooth ranging from —0.5° to +0.5°, the thumbwheels should be set to specify switching below 0.49°. As a practical matter, switching when the correlated coarse error falls below 0.4°, insures that the transition between the correlated coarse error and the fine error will occur without causing any transients.

While the above is a complete description of the preferred embodiments of the present invention, various modifications, alternative constructions, and equivalents can be used. Therefore, the above description and illustrations should not be taken as limiting the scope of the invention which is defined by appended claims.

What is claimed is:

1. Apparatus for generating a position error signal at an error output terminal comprising:
    means for generating a coarse position signal over a coarse position range with a coarse position resolution;
    means for generating a fine position signal over a fine position range with a fine position resolution;
    said coarse and fine position ranges and resolutions being such that particular portions of said coarse and fine position signals have a common range of precision;
    means for generating coarse and fine position commands;
    means for generating a reference clock signal;
    fine latch means, responsive to said reference clock signal, for latching said fine position signal to provide a latched fine position value;
    correlation means, responsive to signals representing corresponding digits in said coarse position signal and said latched fine position value, for generating a correlation output signal when the particular portion of said coarse position error becomes equal to the particular portion of said latched fine position value;
    coarse latch means, responsive to said correlation output signal, for latching said coarse position signal to provide a latched coarse position value;
    means for combining said latched coarse position value and latched fine position value to provide a correlated position value;
    means for combining said coarse and fine position commands to provide a combined position command value;
    means for generating a correlated coarse position error proportional to the difference between said correlated coarse position value and said combined position command value;
    means, responsive to said fine position signal and said fine position command, for generating a fine position error; and
    selector means, coupled to said error output terminal and responsive to said fine position error and said correlated coarse position error for applying said fine position error to said error output terminal when said correlated coarse position error is within a particular range and for applying said correlated coarse position error to said error output terminal when said correlated coarse position error is outside said particular range.

2. The apparatus of claim 1 wherein said position is an angular position.

3. The apparatus of claim 1 wherein said selector means is an analog switch.

4. The apparatus of claim 1 wherein said means for generating a correlated coarse position error comprises a programmed microcomputer.

5. The apparatus of claim 1 wherein said particular range is determined by a set of thumbwheel switches.

6. Apparatus for generating a selected position error signal comprising:
    means for generating a coarse position number over a range of 000.0°–359.9° with a resolution of 0.1°;
    means for generating a fine position number over a range of 0.0000°–0.9999° with a resolution of 0.0001°;
    means for generating coarse and fine position command numbers;
    means for generating a reference clock signal;
    fine latch means, responsive to said reference clock signal, for latching said fine position number to provide a latched fine position number;
    correlation means, responsive to the tenths digit in said coarse position number and the tenths digit in said latched fine position number for generating a correlation output signal when the tenths digit of said coarse position number becomes equal to the tenths digit of said latched fine position number;
    means responsive to said correlation signal for latching said coarse position signal to provide a latched coarse position number;
    means for combining said latched correlated coarse and latched fine position numbers to provide a correlated coarse position number;
    means for combining said coarse and fine position command numbers to provide a combined position command;
    means for generating a correlated coarse position error proportional to the difference between said correlated coarse position number and said combined position command;

means, responsive to said fine position number and said fine position command for generating a fine position error; and switch means, having an output terminal, for applying said fine position error to said output terminal when said correlated coarse position error is within a particular range and for applying said correlated coarse position error to said output terminal when said correlated coarse position error is outside said particular range, whereupon the signal appearing at said output terminal is the selected position error signal.

* * * * *